(12) United States Patent
Zhao et al.

(10) Patent No.: US 12,047,623 B1
(45) Date of Patent: Jul. 23, 2024

(54) COMPUTER-IMPLEMENTED METHODS FOR CROSS-PLATFORM KNOWLEDGE TRANSFER FOR VIDEO CONTENT PERSONALIZATION

(71) Applicant: Amazon Technologies, Inc., Seattle, WA (US)

(72) Inventors: Xing Zhao, Dublin, CA (US); Xuefei Wang, Bothell, WA (US); Kirtan Modi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/066,228

(22) Filed: Dec. 14, 2022

(51) Int. Cl.
*H04N 21/25* (2011.01)
*H04N 21/258* (2011.01)

(52) U.S. Cl.
CPC ..... *H04N 21/251* (2013.01); *H04N 21/25891* (2013.01)

(58) Field of Classification Search
CPC .............. H04N 21/251; H04N 21/25891
See application file for complete search history.

(56) References Cited

U.S. PATENT DOCUMENTS

| | | | |
|---|---|---|---|
| 2009/0328105 A1* | 12/2009 | Craner | H04N 21/44224 725/46 |
| 2022/0248097 A1* | 8/2022 | Docherty | H04N 21/4147 |

* cited by examiner

*Primary Examiner* — Nnenna N Ekpo
(74) *Attorney, Agent, or Firm* — NICHOLSON DE VOS WEBSTER & ELLIOTT LLP

(57) ABSTRACT

Techniques for performing a cross-platform media content personalization are described. According to some examples, a computer-implemented method includes receiving an indication, at a content delivery service from a support service for streaming media player devices, that indicates a set of one or more users of the support service that have a threshold similarity of a record of interactive activity with the support service to a record of interactive activity of a target user with the support service; determining, by the content delivery service, a subset of the users, from the set of one or more users of the support service, that have a record of interactive activity with the content delivery service; determining, by a content recommendation service of the content delivery service, a media file to provide to the target user based on the record of interactive activity with the content delivery service of the subset of the users; and presenting, by a streaming media player device of the target user and that is supported by the support service, the media file to the target user.

20 Claims, 10 Drawing Sheets

COMPUTER-IMPLEMENTED METHODS FOR CROSS-PLATFORM KNOWLEDGE TRANSFER FOR VIDEO CONTENT PERSONALIZATION

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various examples in accordance with the present disclosure will be described with reference to the following drawings.

DETAILED DESCRIPTION

Figure 1:
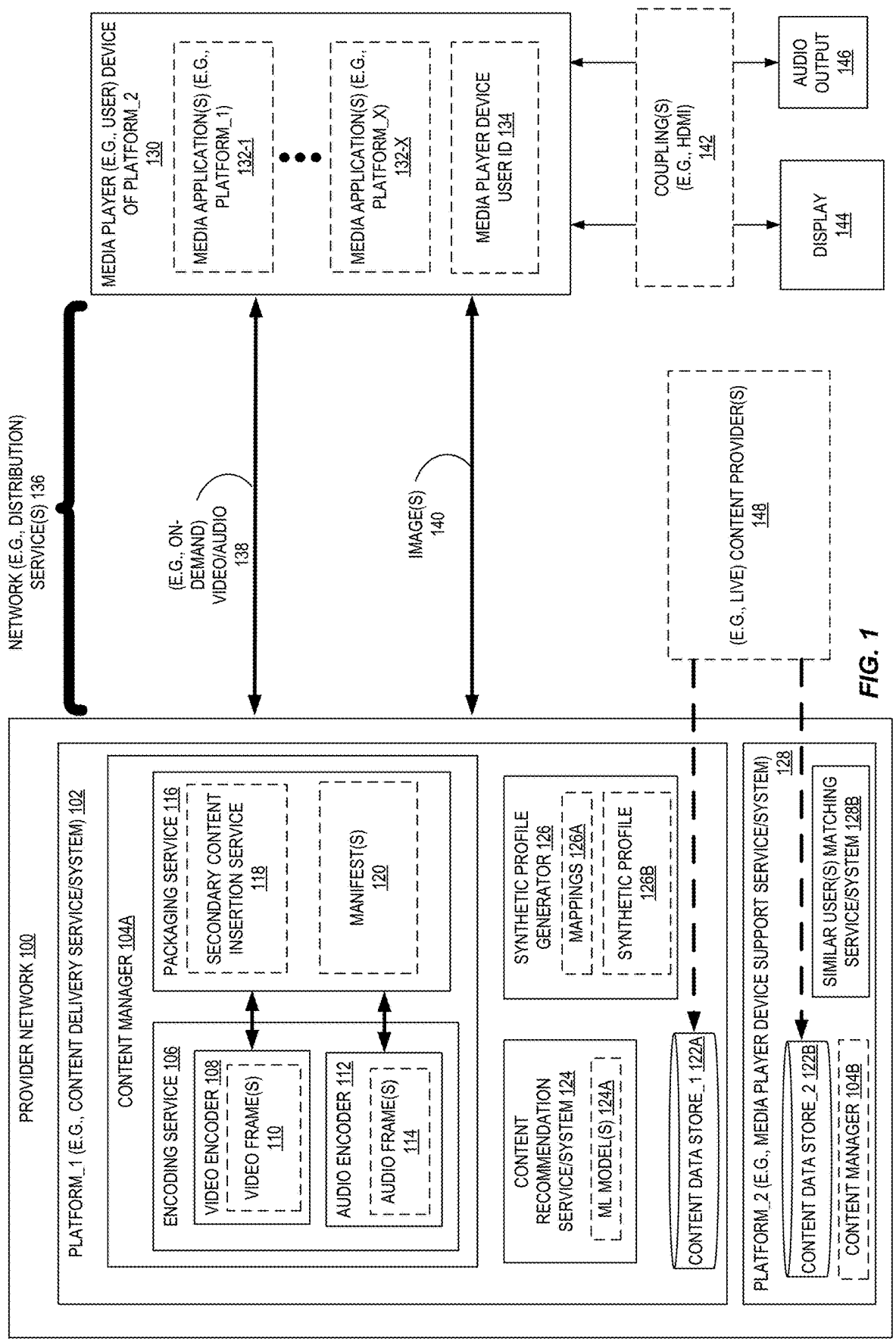
FIG. 1 is a diagram illustrating an environment including a first platform (e.g., a content delivery service/system), a second platform (e.g., a support service/system for a media player device), and a media player (e.g., user) device according to some examples.

The present disclosure relates to methods, apparatus, systems, and non-transitory computer-readable storage media for performing a cross-platform media content personalization. Certain examples herein are directed to a computer-implemented service that performs a cross-platform media content personalization. Certain examples herein use a content (e.g., image, audio, and/or video content) recommendation system/service (e.g., a machine learning model thereof) from a first platform (e.g., a content delivery service/system) to personalize content for a target user (e.g., end-user) on a different platform (e.g., a support service/system for a media player device) (e.g., where the different platform has limited training data). In certain examples, a similar users matching service/system identifies a set of users of the different platform (e.g., a support service/system for a media player device) that are the most similar to (e.g., have a threshold similarity of user activity and/or preferences) users of the different platform to a target user of the different platform. In certain examples, the most similar users of the different platform are then used by the first platform (e.g., a content delivery service/system) to determine a set of those users that have a corresponding record of user activity and/or preferences with the first platform, and the corresponding record(s) are used by the first platform (e.g., content recommendation system/service thereof) to determine a file (e.g., media file) to present to the target user. In certain examples, the first platform is to generate a synthetic profile for the target user of the different platform based on the corresponding records of user activity and/or preferences with the first platform for the set of most similar users. Examples herein thus improve personalized content recommendations for end users across platforms, e.g., improve the reliability and practicability by serving more users and building deeper connections between users' activities across platforms, devices, and/or surfaces.

In certain examples, the media player device delivers digital media (e.g., audio and visual content), e.g., streamed via an internet connection to a connected high-definition display (e.g., television). In certain examples, the media player device (e.g., end user device) utilizes a support service/system for the media player device in support of providing the digital media, for example, the support service/system from the same entity that provided the media player device. In certain examples, the support service/system is accessed via the internet connection of the media player device to provide the media player device one or more media files (e.g., images, videos, audio, etc.). In certain examples, the media player device is separate from a primary display that the user will view (and listen) to the media, e.g., as a "set-top box" or (e.g., High-Definition Multimedia Interface (HDMI) standard) plug-in "stick". Not-limiting examples are Amazon® FireTV® brand of stick media player devices and Google® (e.g., Chromecast) brand of stick media player devices. In certain examples, the media player device includes the primary display that the user will view (and listen) to the media, e.g., as a television with the media player device built in. Not-limiting examples are Amazon® FireTV® brand of (e.g., "smart") televisions.

In certain examples, the media player device includes a processor to run an (e.g., media player device specific) operating system (OS) and/or one or more applications, for example, applications that utilize the internet connection (e.g., of the media player device) to access digital media from a content delivery service/system. In certain examples, the media player device (e.g., processor thereof) executes on one or more internet-connected applications to allow the device's user to watch shows, movies, etc. In certain examples, an (e.g., media) application allows a media player device to connect via an internet connection to a content delivery service/system, for example, a (e.g., subscription) video (e.g., on-demand) over-the-top streaming and/or rental service. Some applications may charge subscription fees, others may be free with ads, and/or some may offer free introductory trials. Not-limiting examples of content delivery services are Amazon® Prime Video® brand content delivery services, Twitch® brand content delivery services (e.g., video game live streaming), and Freevee® brand content delivery services.

Certain entities desire to personalize content (e.g., primary content and/or secondary content (e.g., advertisements)) for a particular target user. For example, a certain user may prefer to view a certain category of media content more than another category or categories, e.g., selected from action, comedy, drama, science fiction, romance, etc. In certain examples, this preference is indicated by a record of user activities and/or preferences generated for that user, e.g., by tracking what content the user is viewing.

In certain examples, a support system/service for a media player device is to provide its end-users (e.g., end-customers) with content according to their preferences (e.g., a list of candidate media files that are selected (e.g., personalized) according to a single particular user's preferences). In certain examples, this includes presenting an indication of the personalized media file (e.g., movie, TV show, etc.) to the target user via a media player device, e.g., so that the target user can select and view the media file via the media player device.

However, certain users of a media player device (and thus a support system/service that supports the operations of the media player device) do not have (i) an account with a particular content delivery application (and thus the content delivery service/system that supports the operations of the content delivery application) or (ii) sufficient record of activities with and/or preferences for the particular content delivery application that (e.g., "suggested") content according to their activities and/or preferences (e.g., a list of candidate media files that are presented according to a single particular user's preferences) can be generated (e.g., according to a desired accuracy).

In certain examples, a target user of a (e.g., FireTV®) brand) media player device has an account and/or sufficient record of activities with and/or preferences for its support service/system but does not have an account and/or sufficient record (e.g., behavioral data) of activities (e.g., viewing data) with and/or preferences for a (e.g., Prime Video®) brand) media application (that utilizes a (e.g., Prime Video®) brand) corresponding content delivery service). Certain examples herein allow for use of (e.g., anonymized) records of activities with and/or preferences for a (e.g., Prime Video®) brand) media application of other similar users to the target user of the (e.g., FireTV®) brand) media player device to generate (e.g., "suggested") content (e.g., by the corresponding content delivery service) according to those activities and/or preferences of the similar users.

In certain examples, the media application utilizes a (e.g., Prime Video® brand) machine learning model (e.g., recommendation engine) of the content delivery service to generate the (e.g., "suggested") content according to the activities and/or preferences of the similar users. Considering the growing constraints from privacy regulations, examples herein allow for the (e.g., accurate) generation of (e.g., "suggested") content according to the activities and/or preferences of the similar users, e.g., where the content delivery application (e.g., and thus the content delivery service/system that supports the operations of the content delivery application) does not have access to (i) the records (e.g., including the customer identification (ID)) for a target user and/or (ii) there are insufficient records (e.g., limited customer behavior data). Examples herein use a Cross-Platform Knowledge Transfer (CPKT), e.g., to learn from records (e.g., datasets) where IDs are available, transfer to datasets where either IDs are not available or there is insufficient customer behavior data, and/or calibrate inputs for a content recommendation service/system (e.g., recommendation machine learning model thereof) provided by the content delivery service/system (that supports the operations of the content delivery application) for content recommendations. Examples herein improve the functioning of a computer-implemented method and/or media player device (e.g., and its support service/system) by allowing for the (e.g., CPKT) identification (e.g., "suggestion") of a proper subset of media content according to the activities and/or preferences of the similar users, e.g., even (i) (a) where a target user (e.g., end customer) chooses not to enable data sharing between their device provider and their content delivery application (e.g., streaming application) provider(s) (e.g., but choose to receive personalized content), and/or (ii) when there is insufficient data for that target user with the content delivery application (e.g., streaming application) provider(s) (e.g., there is missing and/or incomplete data due to limited usage of the content delivery application by the end customer).

Certain examples herein manage consent between content delivery application(s) (e.g., streaming application(s)) and devices to share data and/or algorithms for better end customer content personalization experiences. Certain examples herein manage the sharing of user (e.g., customer) identification data between different platforms, e.g., while not allowing any user (e.g., end user) to view or otherwise access the records and/or identification data of another user.

FIG. 1 is a diagram illustrating an environment including a first platform 102 (e.g., a content delivery service/system), a second platform 128 (e.g., a support service/system for a media player device), and a media player (e.g., user) device of the second platform according to some examples.

In certain examples, the provider network 100 (e.g., cloud provider) is coupled to the media player device 130 via network (e.g., distribution) service(s) 136. In certain examples, media player (e.g., client) device 130 is to play one or more feeds (e.g., live streams), for example, (e.g., on-demand and/or linear television (TV) (e.g., that can be viewed according to a set schedule, e.g., not on demand)) audio/video 138 and/or image(s) 140 (for example, artwork/poster for a title (e.g., movie or TV show) that contains a frame from the title and the title logo(s) placed onto the frame), e.g., sent via network (e.g., distribution) services 136. In certain examples, media player device 130 includes one or more of the components of computer system 800 in FIG. 8 (e.g., processor 810 and/or network interface 840) or one or more of the components of computing device 900 in FIG. 9 (e.g., processor 902).

In certain examples, media player device 130 executes one or more media applications 132-1 to 132-X (where X is an integer greater than 1). In certain examples, each media application 132-1 to 132-X includes a corresponding platform, e.g., implemented on one or more provider network(s) 100. In certain examples, media application 132-1 (e.g., of platform 1) is provided data (e.g., content) by platform 1 (e.g., as content delivery service/system). In certain examples, each media application 132-1 to 132-X includes a corresponding graphical user interface (GUI) that is displayed on display 144, e.g., to allow a user to select "suggested" content for viewing. In certain examples, 128 second platform 128 (e.g., a support service/system for a media player device) supports the media player device 130, for example, sends certain content for display on the display 144 and/or audio output 146, e.g., while allowing a target user to look through the content that is provided by the first platform 102 (e.g., a content delivery service/system).

In certain examples, media player device 130 includes a decoder to decode video for viewing on display 144 and/or audio for outputting on audio output (e.g., speaker) 146. In certain examples, media player device 130 includes a coupling 142 (e.g., according to a standard, such as, but not limited to, a High-Definition Multimedia Interface (HDMI) standard) to display 144 and/or audio output 146. In certain examples, the display 133 and/or audio output (e.g., speaker(s)) are separate from the media player device 130, e.g., a stick media player device. In certain examples, the display 133 and/or audio output (e.g., speaker(s)) are part of the media player device 130, e.g., a smart television device.

In certain examples, media player device 130 includes a media player device user identification (ID) 134, e.g., to uniquely identify the user of that media player device 130. In certain examples, a media player device 130 allows each user of a plurality of users to have their own media player device user identification (ID) 134.

In certain examples, each media application 132-1 to 132-X includes its own media application user (e.g., account) ID, e.g., for each user of a plurality of users to have their own media application user (e.g., account) ID.

In certain examples, a content provider 148 is to send content to a content data store 122A and/or 122B (e.g., which may be implemented in one or more data centers) and/or content manager(s) 104A to 104B (e.g., a single content manager or multiple content managers). In certain examples, a content provider 148 is on site to capture video (e.g., and audio) of a live event. In certain examples, content provider 148 is to encode the resulting output and send that encoded content to one or more downstream entities (e.g., content delivery service/system 102, e.g., via one or more networks.

As one example, a media file (e.g., including a video file and audio file) (e.g., a media container) that is to be encoded is accessed from the content data store 122A by content manager 104A and/or from the content data store 122B by content manager 104B. In certain examples, the media file may be uploaded to one or both of content data stores 122A-122B by content provider(s) or provided directly (e.g., as live content) to one or more content managers 104A-104B by content provider(s) (e.g., from a live content encoder).

In certain examples, the content manager (e.g., described in reference to content manager 104A, but one or more other content managers, such as content manager 104B, may include one or more of the components discussed herein) controls the encoding (e.g., transcoding) of a media file into packages and files in various formats and in different sizes for distribution to end users (e.g., viewers). In certain examples, a user (e.g., separate from an end user or client) creates a job for a (e.g., uncompressed) multimedia file by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain examples, to set up a job, a user specifies the input files (e.g., from content data store 122) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 106 is to encode the media file (e.g., video file and corresponding audio file) into one or more sets of video and audio representations (e.g., streams). In FIG. 1, video encoder 108 is to receive an input of a video file and create video frame(s) 110 from that video file, e.g., for a video frame and/or fragment duration. In FIG. 1, audio encoder 112 is to receive an input of an audio file and create audio frame(s) 114 (e.g., a number of audio samples within each frame) for that audio file, e.g., at an audio frame and/or fragment duration. In certain examples, packaging service 116 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 106 may include a plurality of instances of video encoder 108 and audio encoder 112, e.g., to process multiple inputs in parallel. In certain examples, secondary content insertion service 118 adds secondary content (e.g., advertisement(s)) into a main content. In certain examples, encoding service 106 is to encode both the main content and secondary content, e.g., and the secondary content insertion service 118 is to insert the secondary content into the main content.

In certain examples, a content recommendation service/system 124 is included to recommend content to be displayed and/or audibly played to an end user (e.g., via media player device 130). In certain examples, media player device 130 is to display a video on display 144 and/or output audio on audio output 146. In certain examples, the media is sent from a different source than provider network 100. In certain examples, the content recommendation service/system 124 includes one or more machine learning (ML) models 124A, e.g., trained to generate one or more recommendation of content (e.g., from content data store 122A) for a user (e.g., account holder) of the first platform 102 (e.g., a content delivery service/system).

In certain examples, a target user of a (e.g., FireTV® brand) media player device 130 has an account and/or sufficient record of activities with and/or preferences for its support service/system 128 but does not have an account and/or sufficient record (e.g., behavioral data) of activities (e.g., viewing data) with and/or preferences for a (e.g., Prime Video® brand) media application 132 (that utilizes a (e.g., Prime Video® brand) corresponding content delivery service 102).

Certain examples herein use a similar user(s) matching service/system 128B (e.g., of content delivery service/system 102) to identify one or more of the users (e.g., those users having an account and/or sufficient record of activities with and/or preferences for its support service/system 128)

of the support service/system 128 that are most similar (e.g., within a threshold similarity, e.g., 80%, 85%, 90%, or any other %) to the target user (e.g., having a unique user ID) of the media player device 130 that uses support service/system 128. In certain examples, this subset of users (e.g., FireTV® users) may then be used (e.g., by synthetic profile generator 126) to determine a further subset of those users that also have an account (e.g., Prime Video® users) with content delivery service/system 102 (e.g., via mappings 126A). In certain examples, the mappings 126A map one or more media player device user IDs (e.g., FireTV® user ID) to that user's content delivery service/system 102 account (e.g., account ID) (e.g., Prime Video® account ID) and/or sufficient record of activities with and/or preferences for the content delivery service/system 102. In certain examples, the mappings 126A are in (or accessible by) the support service/system 128 (e.g., when the content delivery service/system 102 and the support service/system 128 allow such data sharing).

In certain examples, the further subset of those support service/system 128 users, that also have an account (e.g., Prime Video® users) with content delivery service/system 102, are then used to generate a content recommendation, e.g., via content recommendation service/system 124 (e.g., one or more machine learning (ML) models 124A thereof). In certain examples, a synthetic profile generator 126 is to generate a synthetic profile 126B (e.g., as discussed below) for the target user of the media player device 130 based on the further subset of those support service/system 128 users, that also have an account (e.g., Prime Video® users) with content delivery service/system 102, e.g., based on the corresponding records of the activities with and/or the preferences for the content delivery service/system 102 for the further subset of those support service/system 128 users that also have an account (e.g., Prime Video® users) with content delivery service/system 102. In certain examples, the synthetic profile 126B is input into content recommendation service/system 124 (e.g., one or more machine learning (ML) models 124A thereof), e.g., to generate a content recommendation for the target user of media player device 130. In certain examples, an indication for the recommended content (or the content itself) is sent to media player 130, e.g., via media application 132-1.

Figure 2:
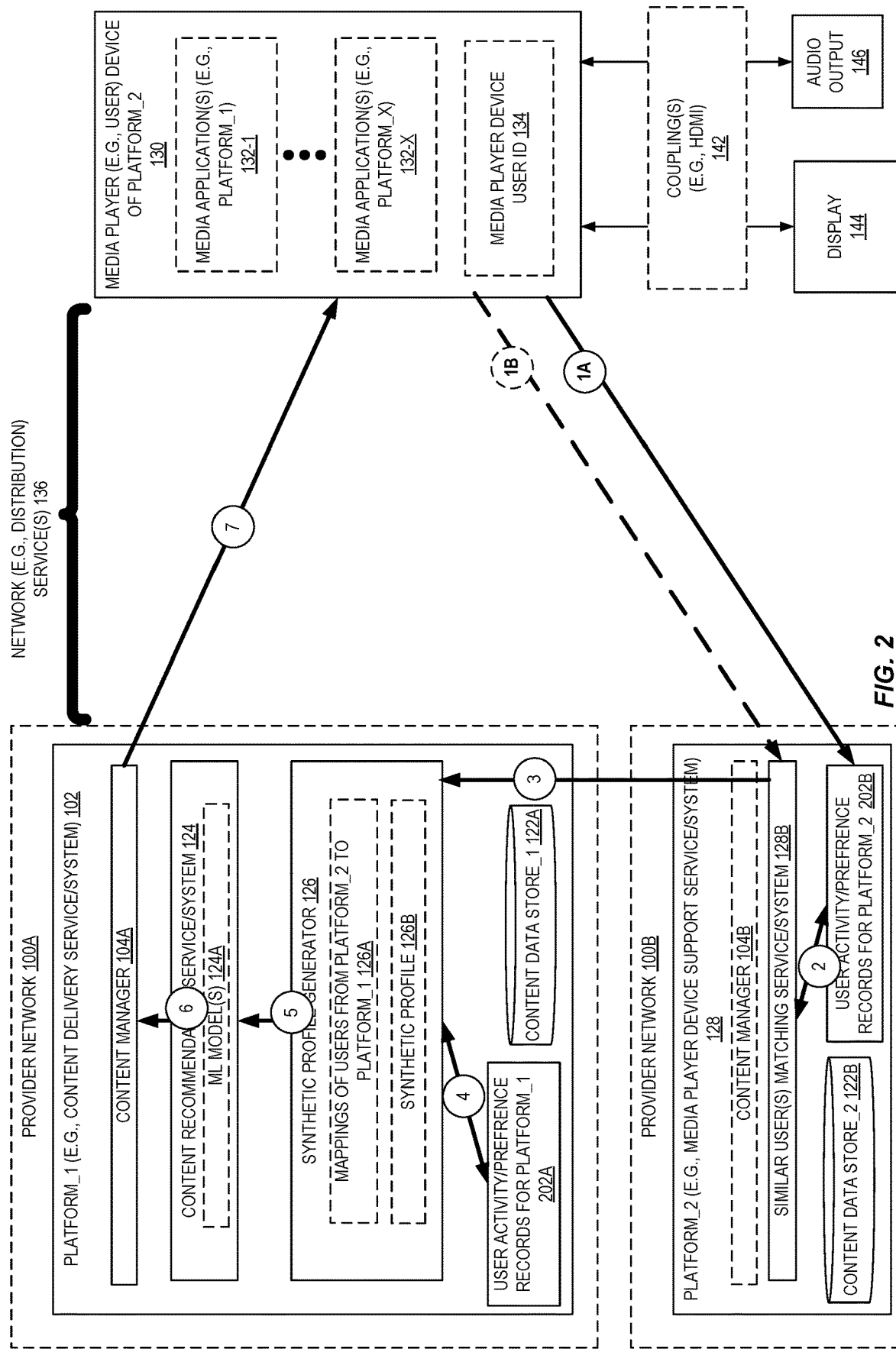
FIG. 2 is a diagram illustrating an example usage flow for a first platform (e.g., a content delivery service/system), a second platform (e.g., a support service/system for a media player device), and a media player (e.g., user) device according to some examples.

FIG. 2 is a diagram illustrating an example usage flow for a first platform 102 (e.g., a content delivery service/system), a second platform 128 (e.g., a support service/system for a media player device), and a media player (e.g., user) device 130 according to some examples. In certain examples, the first platform 102 (e.g., a content delivery service/system) and the second platform 128 (e.g., a support service/system for a media player device) are implemented by same provider network 100, e.g., the same provider company. In certain examples, the first platform 102 (e.g., a content delivery service/system) is implemented by a first provider network 100A and the second platform 128 (e.g., a support service/system for a media player device) is implemented by a different second provider network 100B, e.g., different provider companies.

In FIG. 2, an example usage is that the media player device 130 sends a request, e.g., a request to receive content that is selected for a target user based on that target user (e.g., based on a record of their prior activities and/or preferences) (e.g., as tracked via their media player device user ID 134). In certain examples, this request is in response to the target user logging into their account on the media player device 130 and/or the execution of a media application. In certain examples, the request is sent, e.g., at circled 1A in FIG. 2 or at circled 1B in FIG. 2. In certain examples, the request sent at circled 1A (i) queries a record (e.g., a record 202B) of activities with and/or preferences to see if this target user has insufficient data and/an account or not before switching to similar user(s) matching service/system 128B, and then (ii) queries the target user's preferences to see if this user should be included for and/or excluded from any recommendations. In certain examples, the triggering criteria are combined with both the users' log-in information and the users' preferences/consent in receiving recommended content from any media provider (for example, content delivery service, e.g., via any media application 132). In certain examples, the (optional) request sent at circled 1B (e.g., instead of at 1A) causes the similar user(s) matching service/system 128B to begin its operation(s), e.g., based on the target user.

In certain examples, a content recommendation service/system 124 of the content delivery service/system 102 is to be used to generate a content recommendation for that target user, e.g., but the content delivery service/system 102 does not have (e.g., access to) a (e.g., sufficient) record of (i) the target user's activities with the content delivery service/system 102 and/or (ii) the preferences for the content delivery service/system 102. In certain examples, at circled 2, similar user(s) matching service/system 128B (e.g., of support service/system 128) identifies one or more of the users (e.g., those users having an account and/or sufficient record 202B of activities with and/or preferences for its support service/system 128) of the support service/system 128 that are most similar (e.g., within a threshold similarity, e.g., 80%, 85%, 90%, or any other %) to the target user (e.g., having a unique user ID) of the media player device 130 that uses support service/system 128. In certain examples, an indication of those similar users (for example, their respective media player device account IDs, e.g., FireTV® user IDs) is sent at circled 3 between platforms, e.g., to platform 1 (e.g., to content delivery service/system 102) from platform 2 (e.g., support service/system 128 for media player device 130). In certain examples, the indication of those similar users is sent to the content delivery service/system 102, for example, the synthetic profile generator 126 thereof, e.g., to generate a synthetic profile 126B (e.g., as discussed below) for the target user of the media player device 130 based on the indication of those similar users (e.g., those users that also have an account (e.g., Prime Video® users) with content delivery service/system 102, e.g., based on the corresponding records 202A of the activities with and/or the preferences for the content delivery service/system 102 for the subset of those similar support service/system 128 users that also have an account (e.g., Prime Video® users) with content delivery service/system 102. In certain examples, the synthetic profile 126B is input at circled 5 into content recommendation service/system 124 (e.g., one or more machine learning (ML) models 124A thereof) to generate a content recommendation for the target user of media player device 130, and the content recommendation is sent at circle 6 to content manager 104A. In certain examples, the recommended content is sent at circled 7 (e.g., via content manager 104A) to media player 130, e.g., via receipt by media application 132-1.

In other examples, the indication of those similar users is instead sent, at circled 3, to content recommendation service/system 124 (e.g., one or more machine learning (ML) models 124A thereof) to generate a content recommendation for the target user of media player device 130 based on those similar users, and the content recommendation is sent at circle 6 to content manager 104A.

In certain examples, a target user of a (e.g., FireTV®) brand) media player device 130 has an account and/or sufficient record 202B of activities with and/or preferences for its support service/system 128 but does not have an account and/or sufficient record 202A (e.g., behavioral data) of activities (e.g., viewing data) with and/or preferences for a (e.g., Prime Video® brand) media application 132-1 (that utilizes a (e.g., Prime Video® brand) corresponding content delivery service 102). Certain examples herein allow for use of (e.g., anonymized) records 202A of activities with and/or preferences for a (e.g., Prime Video® brand) media application 132 of other similar users to the target user of the (e.g., FireTV® brand) media player device 130 to generate (e.g., "suggested") content (e.g., by the corresponding content delivery service 102) according to the records 202A of the activities and/or preferences of the similar users.

In certain examples, the media application 132 utilizes a (e.g., Prime Video® brand) machine learning model 124A (e.g., recommendation engine) of the content delivery service 102 to generate the (e.g., "suggested") content according to the records 202A of the activities and/or preferences of the similar users.

Figure 3:
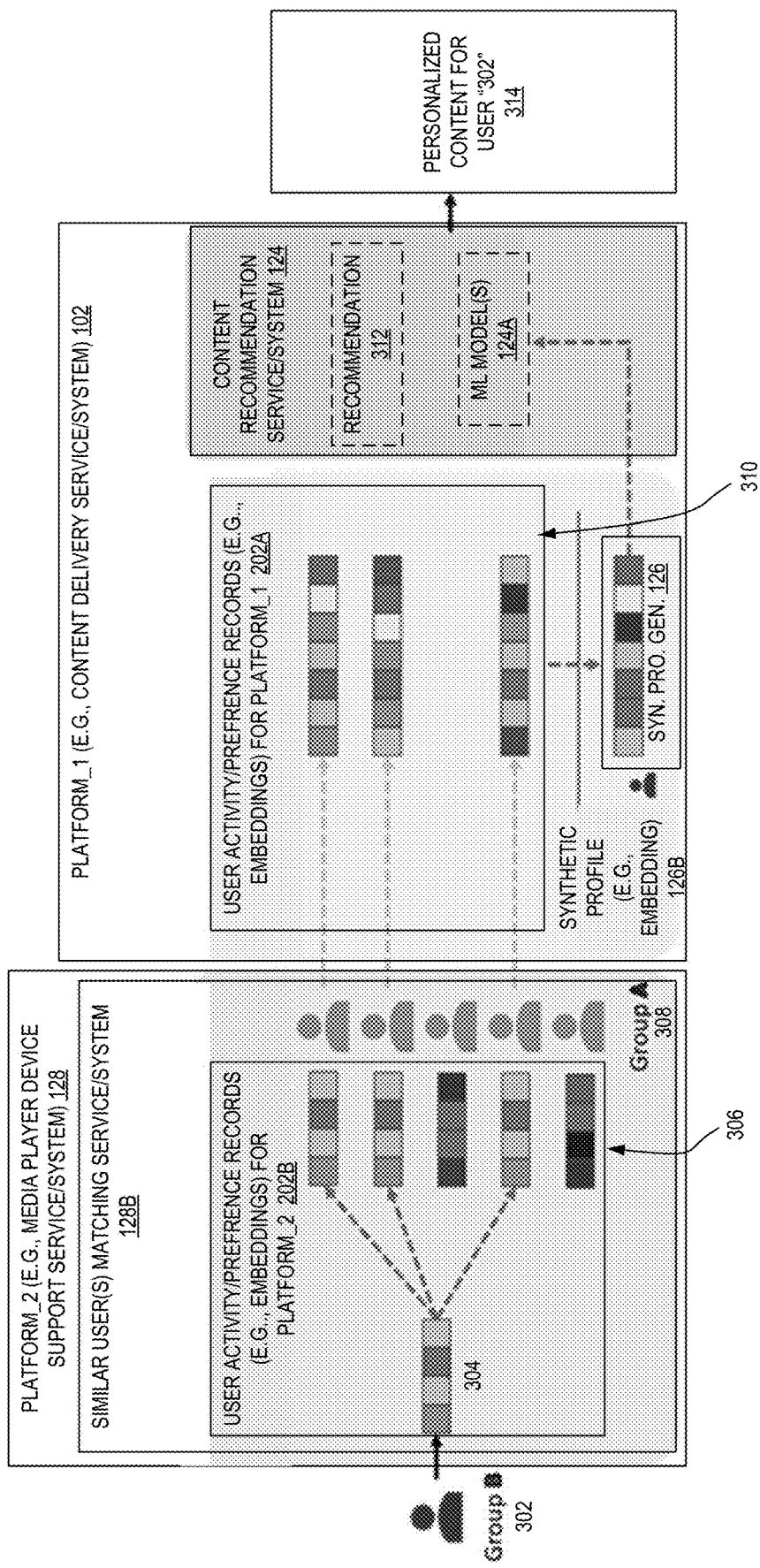
FIG. 3 is a diagram illustrating another example usage flow for a first platform (e.g., a content delivery service/system) and a second platform (e.g., a support service/system for a media player device) to generate personalized content for a target user according to some examples.

FIG. 3 is a diagram illustrating another example usage flow for a first platform 102 (e.g., a content delivery service/system) and a second platform 128 (e.g., a support service/system for a media player device) to generate personalized content for a target user according to some examples.

In certain examples, both a support service/system 128 for a media player device ("D" platform) (e.g., FireTV® media player device and support service/system) and content delivery service/system ("C" platform) (e.g., Prime Video® content delivery service/system) track their users' activities (e.g., watching history, click-through history, etc.), on their own side through respective IDs (e.g., device_id and/or user_id). However, in certain examples, not all identifiers on the support service/system 128 (for a media player device) end can be mapped to the content delivery service/system side, and vice versa. For examples, some users of support service/system 128 (for a media player device) may not have an account and/or sufficient record (e.g., record 202A) (e.g., behavioral data) of activities (e.g., viewing data) with and/or preferences for content delivery service 102, e.g., not having enough historical interaction data in the content delivery service/system 102 platform to adapt the content delivery service/system's recommendation service/system 124 (e.g., model 124A) for accurate recommendations. As a result, in certain examples, a recommendation service/system 124 (e.g., model 124A) based on leveraging IDs tracked across both the content delivery service/system 102 and the support service/system 128 (for a media player device) is limited in providing accurate personalized content (for example, secondary content, e.g., an ad) for only the overlapping users (e.g., overlapping customers). Additionally, among those overlapping users (e.g., overlapping customers), their viewing behavior within the content delivery service/system 102 (e.g., the behavior indicated by the user's interaction with its media application 132) can be different from their viewing behavior on support service/system 128 (e.g., the behavior indicated by the user's interaction with its media player device). Thus, those examples lack a linkage and/or signals to capture the nuances here. Examples (e.g., of CPKT) herein improve recommendation accuracy and applicability without relying on a target user of a media player device having an account and/or sufficient record (e.g., record 202A) (e.g., behavioral data) of activities (e.g., viewing data) with and/or preferences for content delivery service 102, e.g., allowing use of the content delivery service/system 102 to make media content recommendations to customers.

In certain examples, the users (e.g., people) on the support service/system 128 (for a media player device) (e.g., FireTV® media player device's support service/system) side in group "A" 308 have both a content delivery service/system 102 (e.g., Prime Video® content delivery service/system) account (e.g., content delivery service/system ID), e.g., and/or at least a threshold (e.g., sufficient) number of activities (e.g., having a number "N" of activities (e.g., uses of the support service/system 128) in a most recent first number (e.g., 30 days) of $N_{30d} \geq$ first threshold (e.g., 5 activities) and a number of activities in a most recent second number (e.g., 2 years) of $N_{2y} \geq$ second threshold (e.g., 30 activities).

In certain examples, the users (e.g., people) on the support service/system 128 (for a media player device) (e.g., FireTV® media player device's support service/system) side in group "B" 302 do not have either of a content delivery service/system 102 (e.g., Prime Video® content delivery service/system) account (e.g., content delivery service/system ID), e.g., and/or at least a threshold (e.g., sufficient) number of activities (e.g., uses of the support service/system 128).

In certain examples, the users (e.g., people) on the support service/system 128 (for a media player device) (e.g., FireTV® media player device's support service/system) side in group "A" 308 and group "B" 302 have a support service/system (e.g., media player device) IDs (e.g., device_id), e.g., and/or at least a threshold (e.g., sufficient) number of activities (e.g., uses of the support service/system 128) (e.g., a watching history, clicks on recommended content (e.g., tiles, movie, shows, etc.), etc.).

In certain examples, (e.g., each) user "u" (e.g., people) on the support service/system 128 (for a media player device) (e.g., FireTV® media" player Device's support service/system) side (e.g., in group "A" 308 and group "B" 302) (e.g., each registered user with an device account ID) has an explicit activity record of $H^D(u)$, for example, and an (e.g., implicit) embedding for that user of $E^D(u)$. In certain examples, an (e.g., latent) embedding trained from a machine learning model is a compressed representation of user's activities and/or preferences. In certain examples, the user's embedding (e.g., is a vector that) indicates that particular user's activities (e.g., viewing data) with and/or preferences. In certain examples, an (e.g., machine learning) embedding is a way of representing data as points in "n" dimensional space so that similar data points cluster together. In certain examples, an embedding is a numerical representation of real-world objects and relationships, expressed as a vector, e.g., where the vector space quantifies the semantic similarity between categories (such that embedding vectors and/or elements that are close to each other are considered similar). In certain examples, the embedding includes a plurality of elements, e.g., where each element is a different feature.

In certain examples, the (e.g., registered) users (e.g., people) on the Content delivery service/system 102 (e.g., Prime Video® content delivery service/system) side that have a content delivery service/system account (e.g., account ID (account id)) have an (e.g., implicit) embedding for that user of $E^C(u)$, e.g., generated/trained by content recommendation service system 124 (e.g., ML model 124A thereof) based on the user's content delivery service/system activities (e.g., viewing data) with and/or preferences (e.g., for content delivery service 102).

Certain examples herein use the trained content delivery service/system 102 (for example, content recommendation service system 124 thereof, e.g., personalized recommendation ML model 124A) to recommend personalized content to people in the support service/system (for a media player device) group "B" 302.

In certain examples, each user on the support service/system 128 (for a media player device) (e.g., FireTV® media player device's support service/system) side in group "A" 308 has a sufficient record 202B of activities with and/or preferences for its support service/system 128 (e.g., shown in FIG. 3 as the five corresponding embedding vectors at 306 for five users of group "A" 308; where 5 is an example number of users and any number of users, e.g., 1000s, etc., may be used). In certain examples, each user on the support service/system 128 (for a media player device) (e.g., FireTV® media player device's support service/system) side in group "B" 302 has a sufficient record 202B of activities with and/or preferences for its support service/system 128 (e.g., shown in FIG. 3 as an embedding vector 304 for a single (target) user of group "B" 302; where 1 is an example number of users and any number of users, e.g., 1000s, etc., may be used). In certain examples, similar user(s) matching service/system 128B (e.g., of support service/system 128) identifies one or more of the users (e.g., those users having an account and/or sufficient record 202B of activities with and/or preferences for its support service/system 128) of the support service/system 128 that are most similar (e.g., within a threshold similarity, e.g., 80%, 85%, 90%, or any other %) to group "B" 302 (e.g., the target user) (e.g., having a unique user ID) of the media player device 130 that uses support service/system 128. As one example, the similar user(s) matching service/system 128B compares the embedding vector 304 for group "B" 302 (e.g., the target user) to the embedding vectors 308 of group "A" 308 and identifies the similar user(s). In FIG. 3, three similar users are identified and an indication thereof (e.g., their content delivery service/system account IDs) are sent to content delivery service/system 102. In certain examples, the content delivery service/system 102 is to search records 202A of activities with and/or preferences for the content delivery service/system 102 for those similar users (e.g., shown in FIG. 3 as three respective embedding vectors 310 for those three similar users). In certain examples, the corresponding part of records 202A (e.g., embedding vectors 310) for those similar users is used by synthetic profile generator 126 to generate a synthetic profile (e.g., synthetic embedding) 126B for the target user(s) of Group "B" 302.

In certain examples, the synthetic profile (e.g., synthetic embedding) 126B for the target user(s) of Group "B" 302 is input into content recommendation service system 124 (e.g., personalized recommendation ML model 124A) to generate the recommendation 312 (e.g., personalized content). In certain examples, the recommendation 312 is used to generate personalized content 314 for the target user(s) of Group "B" 302, e.g., such that personalized content 314 is sent to display 144 via media player device 130.

As one example, the recommendation 312 indicates a certain category of media content (e.g., selected from action, comedy, drama, science fiction, romance, etc.) and that category is used to select (e.g., from content data store 122A (or 122B)) a media file (e.g., link, etc., for a particular movie, episode, etc.). In certain examples, a link to the media file is presented by media player 130 (e.g., by a GUI of the media player and/or a GUI of application 132) to the target user (e.g., via display 144).

In certain examples, these (e.g., CPKT) methods are utilized for a target user that does not have an account (e.g., ID-less) and/or sufficient record 202A (e.g., behavioral data) of activities (e.g., viewing data) with and/or preferences for a (e.g., Prime Video® brand) media application 132-1 (that utilizes a (e.g., Prime Video® brand) corresponding content delivery service 102).

In certain examples, a (e.g., CPKT) method includes (i) determining a similar user (e.g., buddy match), (ii) determining a synthetic twin, and (iii) generating a personalized recommendation (e.g., of media content). In certain examples, a (e.g., CPKT) method includes a closed feedback loop.

Similar User Matching (e.g., Dynamic Buddy-Matching)

In certain examples, every user has his/her own support service/system 128 (for a media player device 130) activity record. Thus, certain examples herein (e.g., similar user(s) matching service/system 128B) run a similarity model $\Phi$ (e.g., that compares two or more inputs and outputs a similarity score), such as, but not limited to, an explicit Jaccard Index or Cosine Similarity Model (e.g., to compare explicit activity records $H^D$) and/or an implicit (e.g., pre-trained) Embedding Similarity Comparison (e.g., to compare (e.g., implicit) embeddings $E^D$), to find a buddy set, for each user u who does not have a content delivery service/system 102 account (e.g., ID) or sufficient content delivery service/system activities (e.g., records 202A), for example, user u (italicized u) is a member of group "B" 302 (e.g., u $\in$ group "B" 302).

In certain examples, user u's similar users (e.g., "buddy set") satisfies the following conditions:

1. User v (italicized v) in u's similar users set (e.g., "buddy set") $\hat{u}$ has a content delivery service/system 102 account (e.g., ID) and sufficient content delivery service/system activities (e.g., records 202A), for example, user v is a member of group "A" 308 (e.g., v E group "A" 308); and
2. User v in u's similar users set (e.g., "buddy set") $\hat{u}$ has similar support service/system 128 (for a media player device) activity record (e.g., $\Phi(v, u) > \gamma$ where $\gamma$ is the pre-defined similarity threshold).

In this way, even if u $\in$ B does not have a content delivery service/system 102 account (e.g., ID) or sufficient content delivery service/system activities (e.g., records 202A), certain examples herein find u's similar users (e.g., "buddies") on the content delivery service/system 102 side and constructs a synthetic profile (e.g., synthetic twin) with content delivery service/system 102, e.g., embedding, for u.

Synthetic Twin with Content Delivery Service/System Embedding Construction

In certain examples, every u's similar user (e.g., "buddy") is to have a content delivery service/system 102 account (e.g., ID) and sufficient content delivery service/system activities (e.g., records 202A), e.g., v $\in \forall$Vv $\in \hat{u}$, so that each v has a content delivery service/system 102 embedding $E^C$ (e.g., embedding 310). In certain examples, the embedding(s) $E^C$ for user(s) v are used to construct a synthetic twin for the content delivery service/system, e.g., an (e.g., "synthetic") embedding 126B for u, as:

$$E^C(u) = \frac{\sum_{v \in \hat{u}} E^C(v) \times \Phi(v, u)}{\sum_{v \in \hat{u}} \Phi(v, u)}$$

where Φ(v, u) is the similarity score between user v's and u's activity (or implicit embedding) in support service/system 128 (for a media player device) side. In certain examples, both Σ and division method are element wise for a vector of a plurality of elements. In certain examples, through constructing a synthetic twin with content delivery service/system embedding for u ∈ B in content delivery service/system 102 side, a synthetic profile (e.g., content delivery service/system embedding $E^C$) is generated for user u (e.g., even though he/she has never signed-up with content delivery service/system and/or did not have sufficient content delivery service/system activities).

Personalized Recommendation

Certain examples herein provide a personalized media (e.g., advertisement) recommendation for users that have a content delivery service/system 102 account (e.g., ID) and sufficient content delivery service/system activities (e.g., records 202A), e.g., by using the pre-trained content delivery service/system recommendation model and user's embedding $E^C$.

Certain examples herein construct a synthetic twin with a content delivery service/system embedding $E^C$ for u ∈ B who does not have a content delivery service/system 102 account (e.g., ID) or sufficient content delivery service/system activities (e.g., records 202A), e.g., to thus be able to offer improved personalized recommendation (e.g., one or more media files) for u ∈ B, e.g., by directly applying the content delivery service/system recommendation engine for content delivery service/system embedding $E^C$.

Closed Feedback Loop

Figure 4:
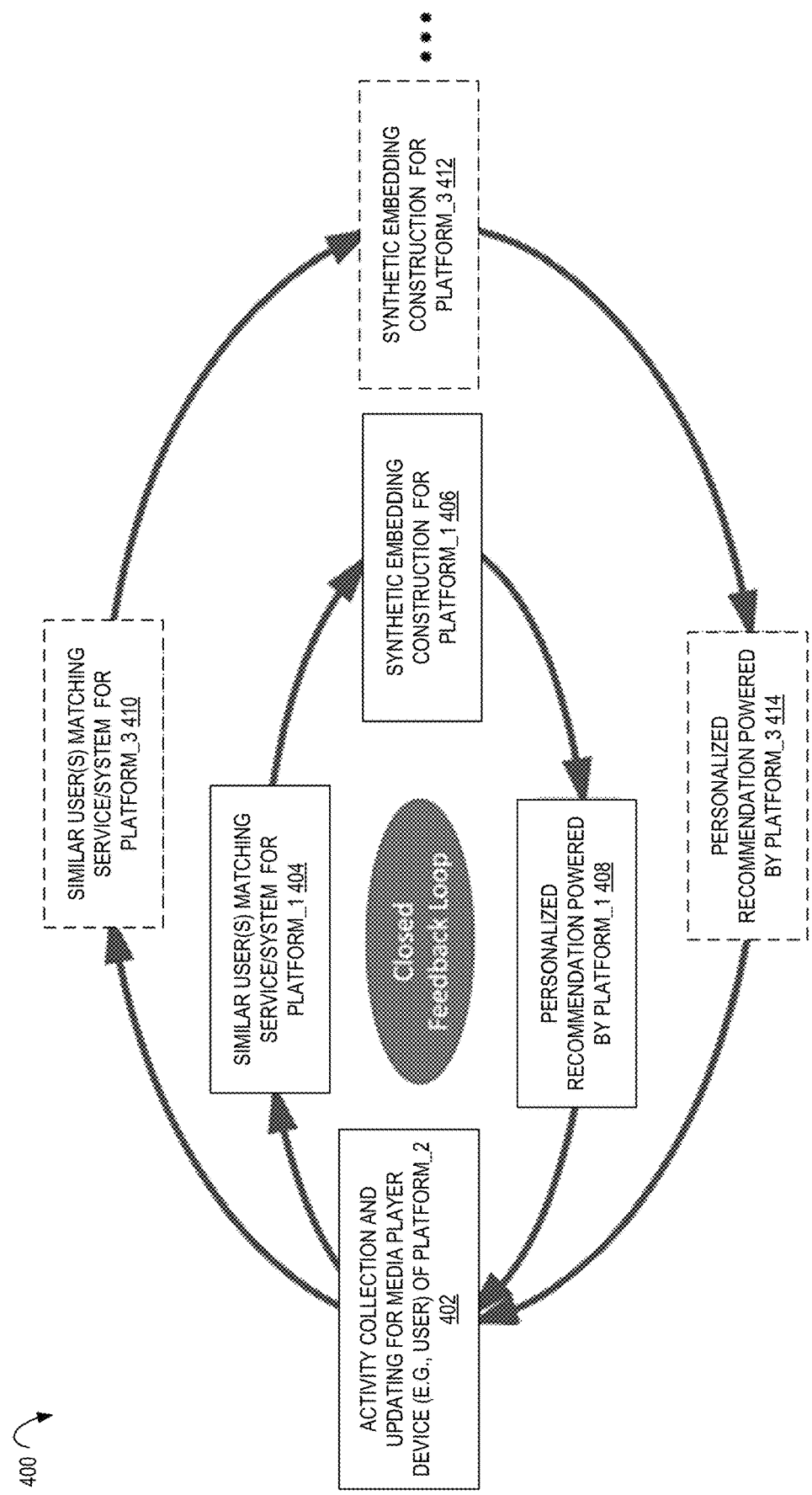
FIG. 4 is a diagram illustrating a closed feedback loop for a first platform (e.g., a content delivery service/system), a second platform (e.g., a support service/system for a media player device), and a third platform (e.g., another content delivery service/system) according to some examples.

FIG. 4 is a diagram illustrating a closed feedback loop 400 for a first platform (e.g., a content delivery service/system), a second platform (e.g., a support service/system for a media player device), and a third platform (e.g., another content delivery service/system) according to some examples. In certain examples, activity collection and updating for media player device (e.g., user) of platform 2 (e.g., support service/system 128 for a media player device) is performed at 402, similar user's matching for platform 1 (e.g., content delivery service/system 102) is performed at 404, a synthetic embedding is constructed for platform 1 (e.g., content delivery service/system 102) at 406, a personalized recommendation powered by platform 1 (e.g., content delivery service/system 102) is generated at 408, and then the loop returns to 402.

In certain examples, a similar loop can be used for other platforms (e.g., an additional content delivery service/system). In certain examples, activity collection and updating for media player device (e.g., user) of platform 2 (e.g., support service/system 128 for a media player device) is performed at 402, similar user's matching for platform 3 (e.g., an additional content delivery service/system) is performed at 410, a synthetic embedding is constructed for platform 3 (e.g., an additional content delivery service/system) at 412, a personalized recommendation powered by platform 3 (e.g., an additional content delivery service/system) is generated at 414, and then the loop returns to 402.

In certain examples, once the user u ∈ B receives the personalized recommendation in platform 2 (e.g., support service/system 128 for a media player device) side at time t, he/she may respond to the recommendation result (e.g., click, ignore, skip, stream, etc.). In certain examples, platform 2 (e.g., support service/system 128 for a media player device) collects these positive or negative responses and updates user u's platform 2 (e.g., support service/system 128 for a media player device) activity and/or preference record $H^D$ and/or platform 2 (e.g., support service/system 128 for a media player device) embedding $E^D$.

In certain examples, other users, e.g., v ∈ A, may also (e.g., concurrently) update their (e.g., activity and/or preference) records and/or embeddings. Thus, the matching (e.g., dynamic buddy-matching) may be re-run again to find a new similar users set (e.g., "buddy set") $û_{t+1}$ for user u ∈ B, (e.g., then close the feedback loop shown in FIG. 4).

Dynamic Synchronization

In certain examples, the (e.g., CPKT) system/method runs in a closed loop, e.g., as discussed in reference to FIG. 4. However, once the loop is established, in certain examples recently updated activities of users u ∈ B on support service/system 128 (for a media player device) side can be used for updating u's similar users set (e.g., "buddy set") û, e.g., periodically. In certain examples, such synchronization helps the content recommendation service system 124 (e.g., personalized recommendation ML model 124A) of content delivery service/system 102 to track the user's up-to-date activities and provide accurate recommendations to fit user's dynamic interests. In certain examples, this updating (e.g., of u's synthetic content delivery service/system 102 profile (e.g., embedding)) is performed at a given interval, e.g., time period.

In certain examples, the synchronization is to be:
1. Energy-efficient, e.g., where a highly frequent updating (e.g., hourly) will result in a significant waste of power as most of the user behaviors will not change by much during that time period (e.g., one hour); however, a relatively low frequent updating (e.g., monthly) will result in an ineffectively tracking of user's dynamic preference shifts;
2. Seasonal: where user behaviors could vary greatly within a year, e.g., more active in summer or holiday seasons and less in other times, the synchronization frequency is to be a season-based feature, rather than a static setting; and
3. Personalized: where each individual user may have difference watching or streaming behaviors, the synchronization frequency is to be personalized, rather than a universal setting.

To achieve one or more of these three goals above, certain examples herein utilize dynamic synchronization. In certain examples, a same similarity model Φ (e.g., as discussed above) is used to identify the similarity between user u's support service/system 128 (for a media player device) embedding $E^D (u, t_1)$ at time $t_1$ and embedding $E^D (u, t_2)$ at time $t_2$. Certain examples herein set a hyper-parameter, δ, as a threshold to determine when to re-run the similar user(s) matching (e.g., dynamic buddy-matching) for u, e.g., to update their content delivery service/system 102 (e.g., synthetic) embedding $E^C (u, t_2)$ at time $t_2$ or not.

In certain examples this is:
Re-run similar user(s) matching (e.g., dynamic buddy-matching) for u at $t_2$ is
  Yes when Φ ($E^D (u, t_1), E^D (u, t_2)$) is less than or equal to δ;
  No otherwise.
In certain examples, this is performed by similar user(s) matching service/system 128B.

Further Optimization

Certain examples herein (e.g., of CPKT) a target user (e.g., user u ∈ B) to experience a personalized recommendation in a media player device 130 supported by support service/system 128. In certain examples, not only can the target user (e.g., user u ∈ group B) use the methods herein (e.g., CPKT) for personalized content recommendations, users of group "A" (e.g., user u ∈ A) is also able to utilize it. In certain examples, a user's content delivery service/ system 102 activities can be used to predict their interests on other device placements, e.g., where media content (e.g., movies/shows) are displayed to them. However, in certain examples, there can be limitations in completely relying on users' activities in content delivery service/system 102 for other content recommendations (e.g., ad placements) as customers behaviors may vary among different devices/surfaces. In certain examples, using content recommendation activities of the users can further improve the systems and methods herein to develop an understanding of users' real interests and preferences, under the premises that such systems/methods are able to recognize, verify, and record that behavior data. Therefore, certain examples herein further enhance the recommendations for users in A as well, to match their similar users (e.g., "closer" buddies) based on their unique behaviors on those new media suggestions. In certain examples, this further reduces the dependency of users' behaviors on the content delivery service/system end, and mitigates the distortion of activities among various devices/surfaces.

Certain examples herein thus provide systems and methods for cross-platform knowledge transfer (CPKT), e.g., using a pre-trained model to personalize media content (e.g., to target a particular user) for end-users on a different platform (e.g., with limited training data). Certain examples herein use (i) a support service/system for a media player device and (ii) a content delivery service/system (e.g., personalized recommendation ML model thereof) to enable and/or improve personalized recommendations for end users across multiple platforms, e.g., to improve the reliability and practicability by serving more users and building deeper connections between users' activities across devices/surfaces.

Figure 5:
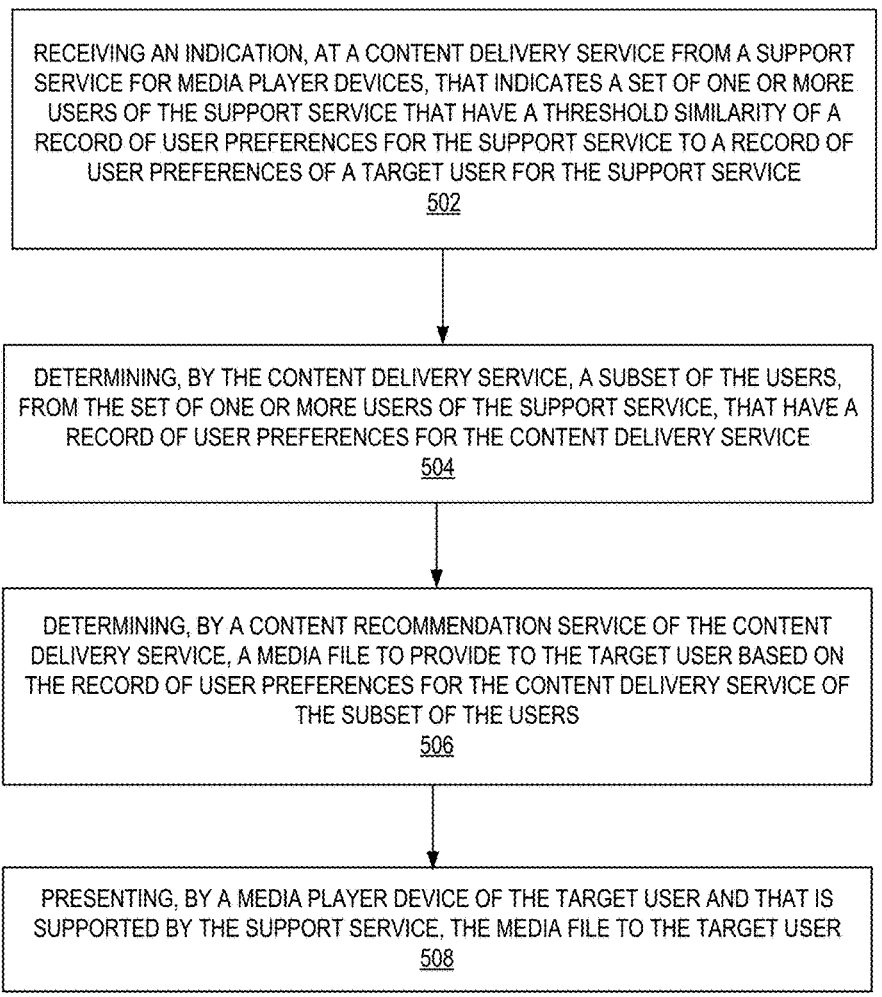
FIG. 5 is a flow diagram illustrating operations of a method of performing a cross-platform media file content personalization according to some examples.

FIG. 5 is a flow diagram illustrating operations 500 of a method of performing a cross-platform media file content personalization according to some examples. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 500 are performed by a content delivery service/system 102 (e.g., implemented in a provider network) of the other figures.

The operations 500 include, at block 502, receiving an indication, at a content delivery service from a support service for media player devices, that indicates a set of one or more users of the support service that have a threshold similarity of a record of user preferences for the support service to a record of user preferences of a target user for the support service. The operations 500 further include, at block 504, determining, by the content delivery service, a subset of the users, from the set of one or more users of the support service, that have a record of user preferences for the content delivery service. The operations 500 further include, at block 506, determining, by a content recommendation service of the content delivery service, a media file to provide to the target user based on the record of user preferences for the content delivery service of the subset of the users. The operations 500 further include, at block 508, presenting, by a media player device of the target user and that is supported by the support service, the media file to the target user.

Exemplary environments, systems, etc. that the above may be used in are detailed below.

At least some examples of the disclosed technologies can be described in view of the following examples:

Example 1. A computer-implemented method comprising:
receiving an indication, at a (e.g., streaming) content delivery service (e.g., separate from the support service and/or the media player device) from a support service for (e.g., streaming) media player devices, that indicates a set (e.g., a proper subset) of one or more users of the support service that have a threshold similarity of a record of (e.g., previous) interactive activity with the support service to a record of interactive activity of a target user with the support service;
determining, by the content delivery service, a subset of the users, from the set of one or more users of the support service, that have a record of interactive activity with the content delivery service;
determining, by a content recommendation service of the content delivery service, a media file to provide to the target user based on the record of interactive activity with the content delivery service of the subset of the users; and presenting, by a streaming media player device of the target user and that is supported by the support service, the media file to the target user.

Example 2. The computer-implemented method of example 1, wherein the record of interactive activity with the content delivery service of the subset of the users comprises an embedding vector of interactive activity with the content delivery service of the subset of the users, and the determining the media file comprises generating an inference with a machine learning model of the content recommendation service for an input based on the embedding vector of the subset of the users.

Example 3. The computer-implemented method of example 1, further comprising determining there is less than a threshold amount of a record of interactive activity for the target user with the content delivery service, wherein at least the receiving the indication is in response to the determining there is less than the threshold amount of the record of interactive activity for the target user with the content delivery service.

Example 4. A computer-implemented method comprising:
receiving an indication, at a content delivery service from a support service for media player devices, that indicates a set of one or more users of the support service that have a threshold similarity of a record of user preferences for the support service to a record of user preferences of a target user for the support service;
determining, by the content delivery service, a subset of the users, from the set of one or more users of the support service, that have a record of user preferences for the content delivery service;
determining, by a content recommendation service of the content delivery service, a media file to provide to the target user based on the record of user preferences for the content delivery service of the subset of the users; and presenting, by a media player device of the target user and that is supported by the support service, the media file to the target user.

Example 5. The computer-implemented method of example 4, wherein the record of user preferences for the content delivery service of the subset of the users comprises an embedding vector of user preferences for the content delivery service of the subset of the users, and the determining the media file comprises generating an inference with a machine learning model of the content recommendation service for an input based on the embedding vector of the subset of the users.

Example 6. The computer-implemented method of example 5, further comprising generating a synthetic embedding vector for the target user based on the embedding vector of user preferences for the content delivery service for each user of a plurality of users of the subset of the users, wherein the input to the machine learning model of the content recommendation service comprises the synthetic embedding vector generated for the target user.

Example 7. The computer-implemented method of example 6, wherein the generating the synthetic embedding vector comprises weighting the embedding vector of user preferences for the content delivery service for each user of the plurality of users of the subset of the users based on a respective similarity of the record of that user preferences for the support service to the record of user preferences of the target user for the support service.

Example 8. The computer-implemented method of example 4, further comprising determining there is less than a threshold amount of a record of user preferences for the target user with the content delivery service, wherein at least the receiving the indication is in response to the determining there is less than the threshold amount of the record of user preferences for the target user with the content delivery service.

Example 9. The computer-implemented method of example 8, wherein the threshold amount of the record is a threshold number of activities at the content delivery service by the target user within a time period.

Example 10. The computer-implemented method of example 4, further comprising determining the target user does not have a content delivery service account, wherein at least the receiving the indication is in response to the determining the target user does not have the content delivery service account.

Example 11. The computer-implemented method of example 4, further comprising updating the record of user preferences of the target user for the support service based on the target user playing or not playing the media file on the media player device of the target user.

Example 12. The computer-implemented method of example 11, further comprising performing another iteration of the computer-implemented method based at least in part on the updated record of user preferences of the target user for the support service.

Example 13. The computer-implemented method of example 12, wherein the performing the another iteration is trigged in response to a similarity of the record of user preferences for the support service to the updated record of user preferences of the target user for the support service falling below an update threshold.

Example 14. The computer-implemented method of example 4, wherein the content delivery service is implemented on a first provider network and the support service for media player devices is implemented on a different second provider network.

Example 15. A system comprising:
  a content data store to store a media file; and
  one or more electronic devices to implement a content delivery service, the content delivery service including instructions that upon execution cause the content delivery service to perform operations comprising:
    receiving an indication, at the content delivery service from a support service for media player devices, that indicates a set of one or more users of the support service that have a threshold similarity of a record of user preferences for the support service to a record of user preferences of a target user for the support service,
    determining, by the content delivery service, a subset of the users, from the set of one or more users of the support service, that have a record of user preferences for the content delivery service,
    determining, by a content recommendation service of the content delivery service, a media file to provide to the target user based on the record of user preferences for the content delivery service of the subset of the users, and
    sending the media file to a media player device of the target user and that is supported by the support service.

Example 16. The system of example 15, wherein the record of user preferences for the content delivery service of the subset of the users comprises an embedding vector of user preferences for the content delivery service of the subset of the users, and the determining the media file comprises generating an inference with a machine learning model of the content recommendation service for an input based on the embedding vector of the subset of the users.

Example 17. The system of example 16, wherein the instructions upon execution cause the content delivery service to perform further operations comprising generating a synthetic embedding vector for the target user based on the embedding vector of user preferences for the content delivery service for each user of a plurality of users of the subset of the users, wherein the input to the machine learning model of the content recommendation service comprises the synthetic embedding vector generated for the target user.

Example 18. The system of example 15, wherein the instructions upon execution cause the content delivery service to perform further operations comprising determining there is less than a threshold amount of a record of user preferences for the target user with the content delivery service, wherein at least the receiving the indication is in response to the determining there is less than the threshold amount of the record of user preferences for the target user with the content delivery service.

Example 19. The system of example 15, wherein the instructions upon execution cause the content delivery service to perform further operations comprising determining the target user does not have a content delivery service account, wherein at least the receiving the indication is in response to the determining the target user does not have the content delivery service account.

Example 20. The system of example 15, wherein the instructions upon execution cause the content delivery service to perform further operations comprising:
  updating the record of user preferences of the target user for the support service based on the target user playing or not playing the media file on the media player device of the target user; and
  performing another iteration of the operations based at least in part on the updated record of user preferences of the target user for the support service.

Figure 6:
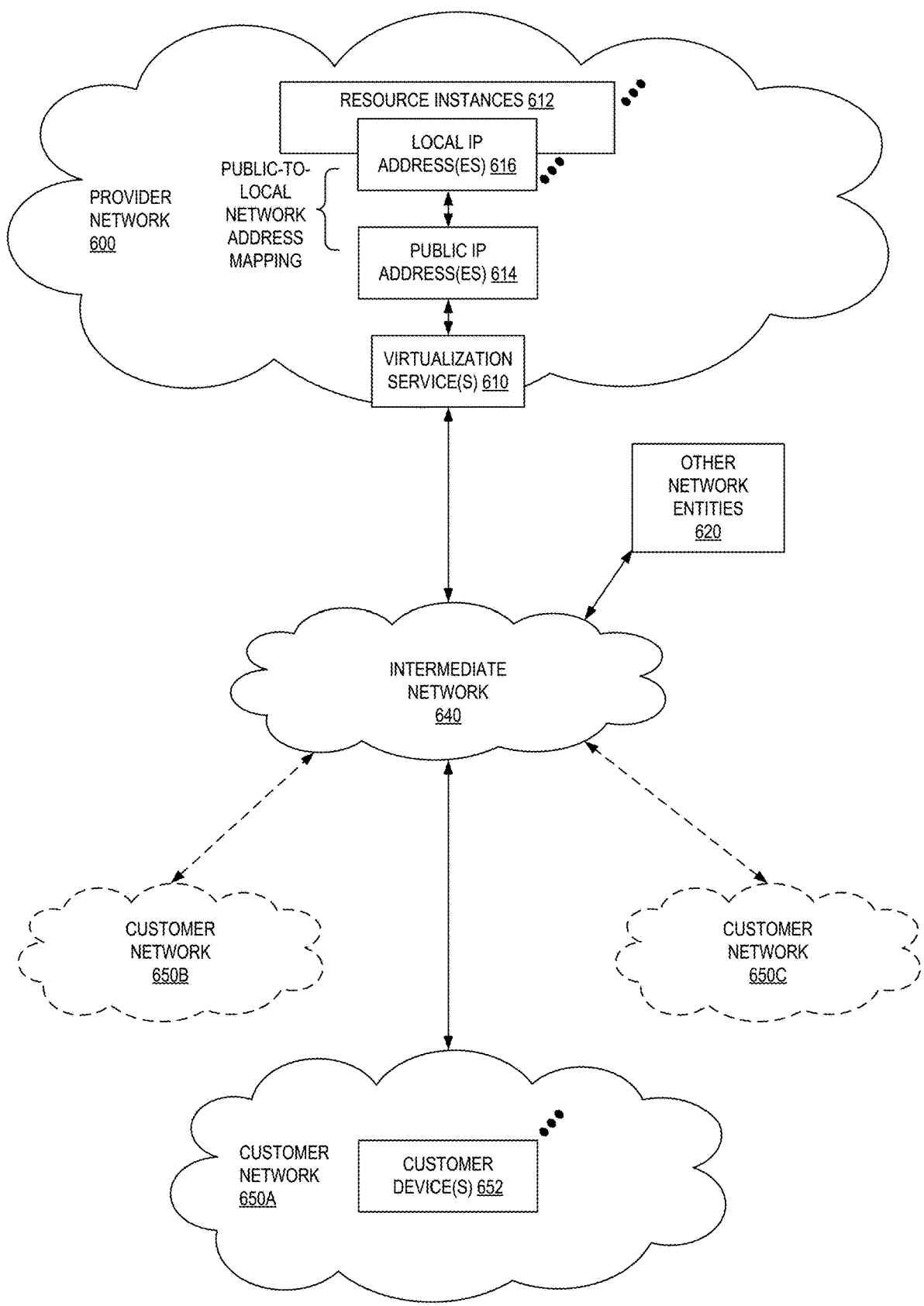
FIG. 6 illustrates an example provider network environment according to some examples.

FIG. 6 illustrates an example provider network (or "service provider system") environment according to some examples. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some examples, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
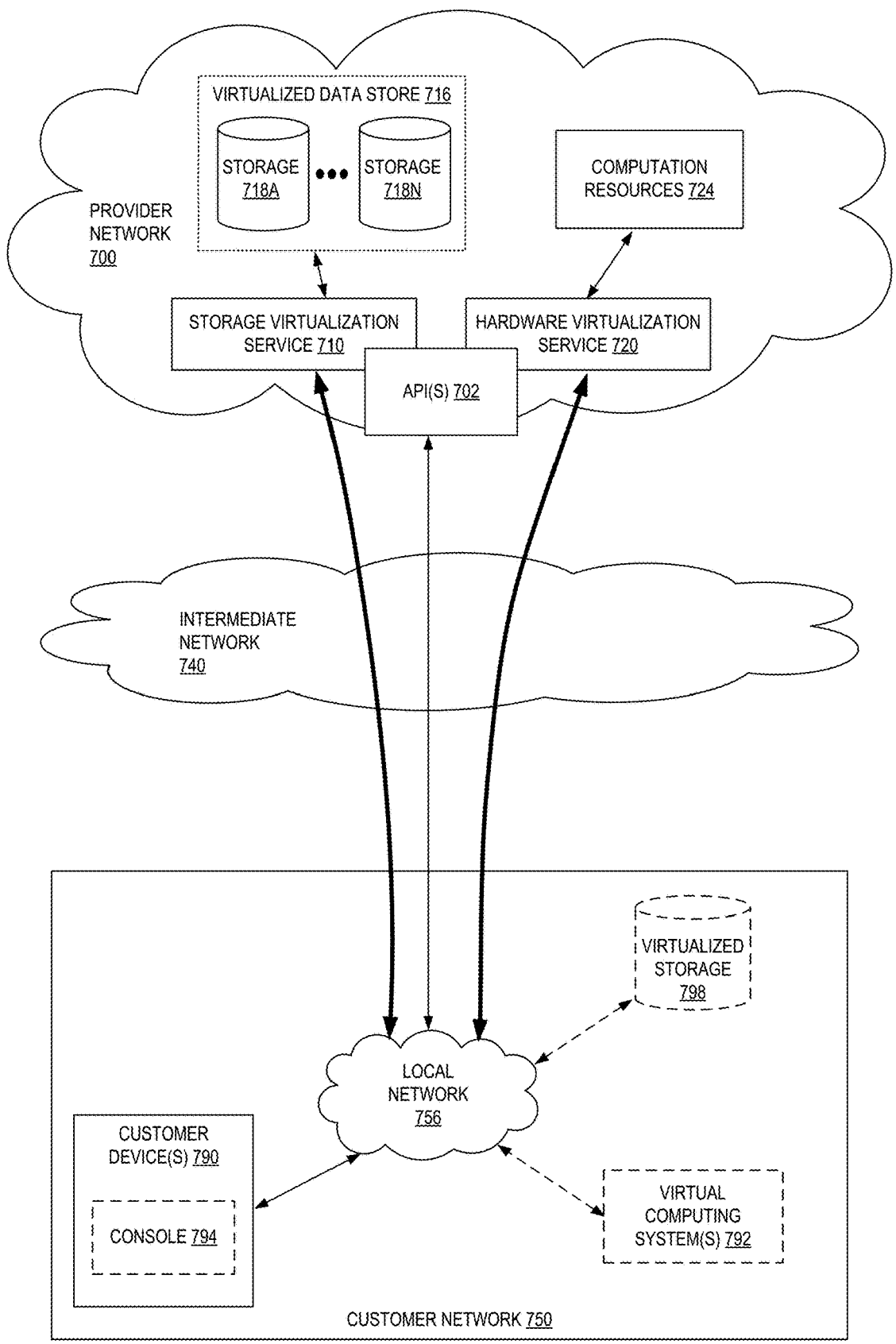
FIG. 7 is a block diagram of an example provider network that provides a storage service and a hardware virtualization service to customers according to some examples.

FIG. 7 is a block diagram of an example provider network that provides a storage service and a hardware virtualization service to customers, according to some examples. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some examples, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some examples, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some examples, a virtualized data store gateway (not shown) may be provided at the customer network 750 that may locally cache at least some data, for example frequently accessed or critical data, and that may communicate with storage service 710 via one or more communications channels to upload new or modified data from a local cache so that the primary store of data (virtualized data store 716) is maintained. In some examples, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
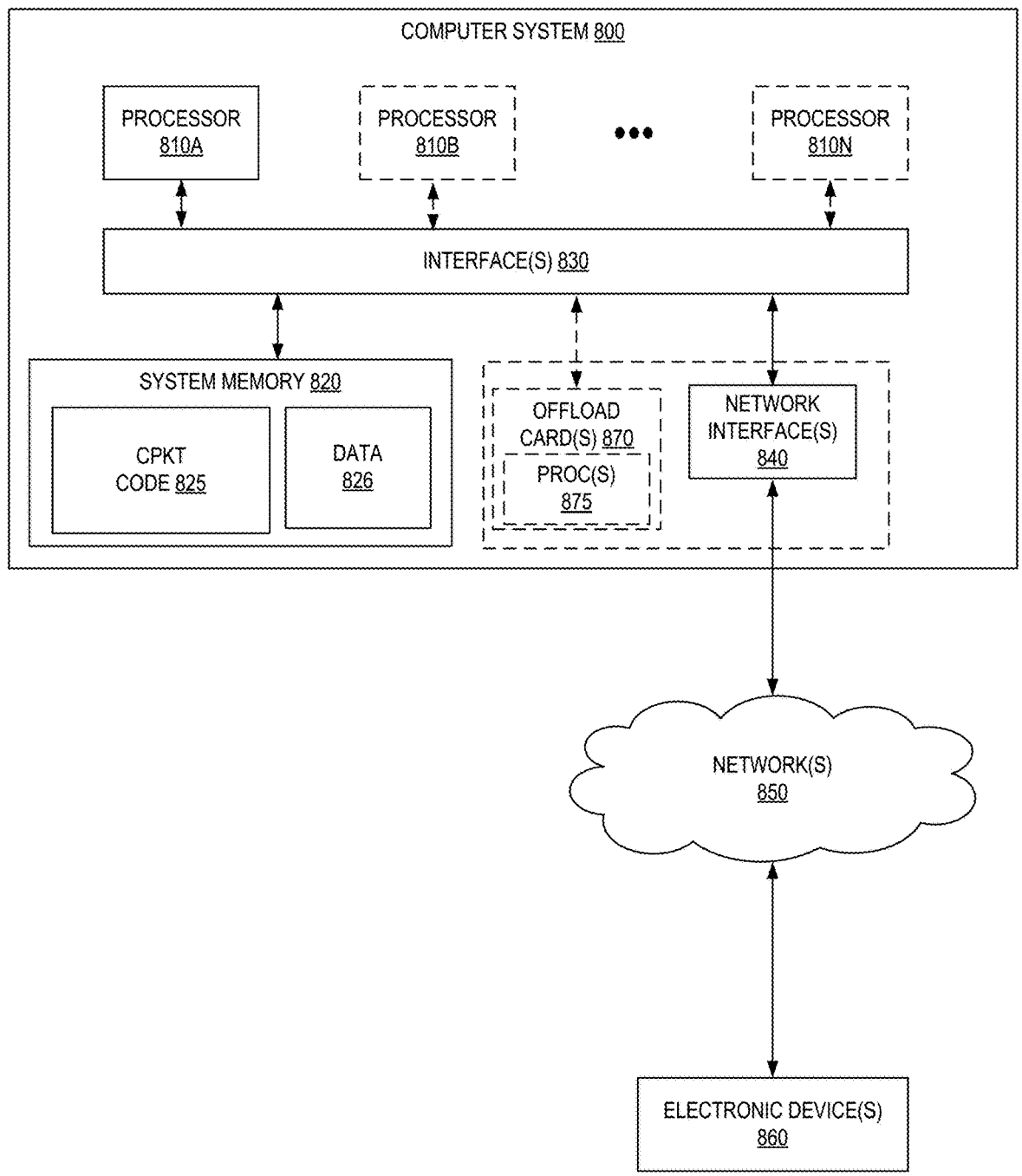
FIG. 8 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 800 illustrated in FIG. 8. In the illustrated example, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various examples a computer system 800 may include one computing device or any number of computing devices configured to work together as a single computer system 800.

In various examples, computer system 800 may be a uniprocessor system including one processor 810, or a multiprocessor system including several processors 810 (e.g., two, four, eight, or another suitable number). Processors 810 may be any suitable processors capable of executing instructions. For example, in various examples, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various examples, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 820 as cross-platform knowledge transfer (CPKT) code 825 (e.g., executable to implement, in whole or in part, the operations discussed herein) and data 826.

In one example, I/O interface 830 may be configured to coordinate I/O traffic between processor 810, system memory 820, and any peripheral devices in the device, including network interface 840 or other peripheral interfaces. In some examples, I/O interface 830 may perform any necessary protocol, timing, or other data transformations to convert data signals from one component (e.g., system memory 820) into a format suitable for use by another component (e.g., processor 810). In some examples, I/O interface 830 may include support for devices attached through various types of peripheral buses, such as a variant of the Peripheral Component Interconnect (PCI) bus standard or the Universal Serial Bus (USB) standard, for example. In some examples, the function of I/O interface 830 may be split into two or more separate components, such as a north bridge and a south bridge, for example. Also, in some examples some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various examples, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some examples the offload card(s) 870 can perform compute instance management operations such as pausing and/or un-pausing compute instances, launching and/or terminating compute instances, performing memory transfer/copying operations, etc. These management operations may, in some examples, be performed by the offload card(s) 870 in coordination with a hypervisor (e.g., upon a request from a hypervisor) that is executed by the other processors 810A-810N of the computer system 800. However, in some examples the virtualization manager implemented by the offload card(s) 870 can accommodate requests from other entities (e.g., from compute instances themselves), and may not coordinate with (or service) any separate hypervisor.

In some examples, system memory 820 may be one example of a computer-accessible medium configured to store program instructions and data as described above. However, in other examples, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some examples of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
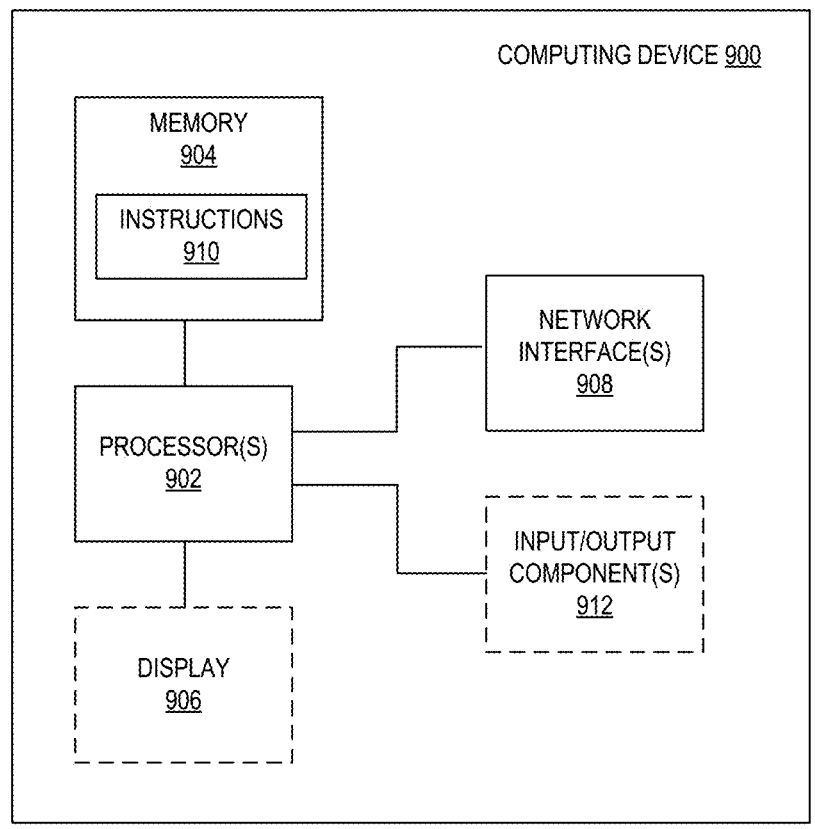
FIG. 9 illustrates a logical arrangement of a set of general components of an exemplary computing device that can be utilized in accordance with various examples.

FIG. 9 illustrates a logical arrangement of a set of general components of an example computing device 900. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (for example, instructions 910, e.g., which implement a content delivery service as disclosed herein), and a set of one or more wired or wireless network interfaces 908 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 910) for execution on the set of one or more processors 902 of that electronic device. One or more parts of various examples may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some examples include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 10:
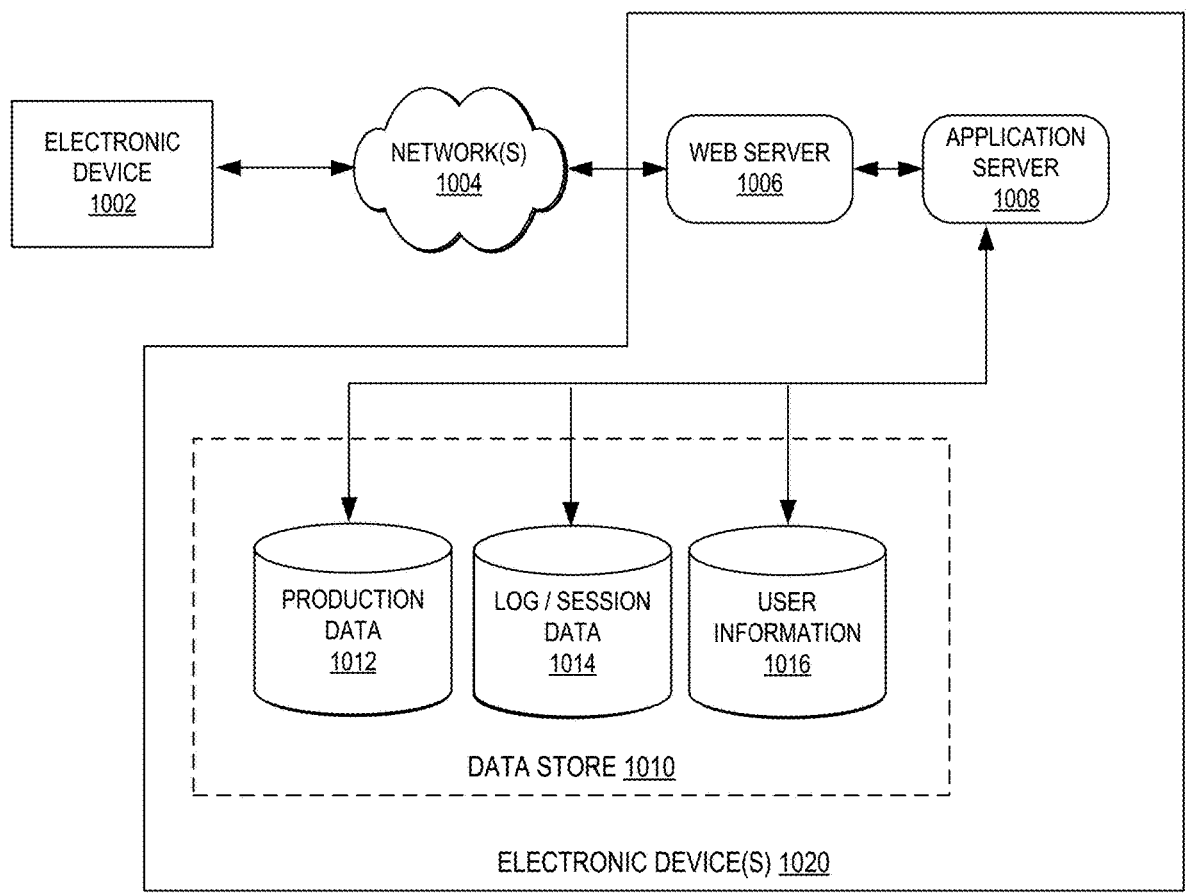
FIG. 10 illustrates an example of an environment for implementing aspects in accordance with various examples.

As discussed, different approaches can be implemented in various environments in accordance with the described examples. For example, FIG. 10 illustrates an example of an environment 1000 for implementing aspects in accordance with various examples. For example, in some examples messages are HyperText Transfer Protocol (HTTP) requests that are received by a web server (e.g., web server 1006), and the users, via electronic devices, may interact with the provider network via a web portal provided via the web server 1006 and application server 1008. As will be appreciated, although a web-based environment is used for purposes of explanation, different environments may be used, as appropriate, to implement various examples. The system includes an electronic client device 1002, which may also be referred to as a client device and can be any appropriate device operable to send and receive requests, messages, or information over an appropriate network 1004 and convey information back to a user of the device 1002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1004 includes the Internet, as the environment includes a web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio, video, etc., to be transferred to the client device 1002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1002 and the application server 1008, can be handled by the web server 1006. It should be understood that the web server 1006 and application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information 1016 to verify the identity of the user and can access a production data 1012 to obtain information about items of that type. The information can then be returned to the user, such as in a listing of results on a web page that the user is able to view via a browser on the user device 1002. Information for a particular item of interest can be viewed in a dedicated page or window of the browser.

The web server 1006, application server 1008, and/or data store 1010 may be implemented by one or more electronic devices 1020, which can also be referred to as electronic server devices or server end stations, and may or may not be located in different geographic locations. Each of the one or more electronic devices 1020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 718A-718N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving an indication, at a content delivery service from a support service for streaming media player devices, that indicates a set of one or more users of the support service that have a threshold similarity of a record of interactive activity with the support service to a record of interactive activity of a target user with the support service;
determining, by the content delivery service, a subset of the users, from the set of one or more users of the support service, that have a record of interactive activity with the content delivery service;
determining, by a content recommendation service of the content delivery service, a media file to provide to the target user based on the record of interactive activity with the content delivery service of the subset of the users; and
presenting, by a streaming media player device of the target user and that is supported by the support service, the media file to the target user.

2. The computer-implemented method of claim 1, wherein the record of interactive activity with the content delivery service of the subset of the users comprises an embedding vector of interactive activity with the content delivery service of the subset of the users, and the determining the media file comprises generating an inference with a machine learning model of the content recommendation service for an input based on the embedding vector of the subset of the users.

3. The computer-implemented method of claim 1, further comprising determining there is less than a threshold amount of a record of interactive activity for the target user with the content delivery service, wherein at least the receiving the indication is in response to the determining there is less than the threshold amount of the record of interactive activity for the target user with the content delivery service.

4. A computer-implemented method comprising:
receiving an indication, at a content delivery service from a support service for media player devices, that indicates a set of one or more users of the support service that have a threshold similarity of a record of user preferences for the support service to a record of user preferences of a target user for the support service;
determining, by the content delivery service, a subset of the users, from the set of one or more users of the support service, that have a record of user preferences for the content delivery service;
determining, by a content recommendation service of the content delivery service, a media file to provide to the target user based on the record of user preferences for the content delivery service of the subset of the users; and
presenting, by a media player device of the target user and that is supported by the support service, the media file to the target user.

5. The computer-implemented method of claim 4, wherein the record of user preferences for the content delivery service of the subset of the users comprises an embedding vector of user preferences for the content delivery service of the subset of the users, and the determining the media file comprises generating an inference with a machine learning model of the content recommendation service for an input based on the embedding vector of the subset of the users.

6. The computer-implemented method of claim 5, further comprising generating a synthetic embedding vector for the target user based on the embedding vector of user preferences for the content delivery service for each user of a plurality of users of the subset of the users, wherein the input to the machine learning model of the content recommendation service comprises the synthetic embedding vector generated for the target user.

7. The computer-implemented method of claim 6, wherein the generating the synthetic embedding vector comprises weighting the embedding vector of user preferences for the content delivery service for each user of the plurality of users of the subset of the users based on a respective similarity of the record of that user preferences for the support service to the record of user preferences of the target user for the support service.

8. The computer-implemented method of claim 4, further comprising determining there is less than a threshold amount of a record of user preferences for the target user with the content delivery service, wherein at least the receiving the indication is in response to the determining there is less than the threshold amount of the record of user preferences for the target user with the content delivery service.

9. The computer-implemented method of claim 8, wherein the threshold amount of the record is a threshold number of activities at the content delivery service by the target user within a time period.

10. The computer-implemented method of claim 4, further comprising determining the target user does not have a content delivery service account, wherein at least the receiving the indication is in response to the determining the target user does not have the content delivery service account.

11. The computer-implemented method of claim 4, further comprising updating the record of user preferences of the target user for the support service based on the target user playing or not playing the media file on the media player device of the target user.

12. The computer-implemented method of claim 11, further comprising performing another iteration of the computer-implemented method based at least in part on the updated record of user preferences of the target user for the support service.

13. The computer-implemented method of claim 12, wherein the performing the another iteration is trigged in response to a similarity of the record of user preferences for the support service to the updated record of user preferences of the target user for the support service falling below an update threshold.

14. The computer-implemented method of claim 4, wherein the content delivery service is implemented on a first provider network and the support service for media player devices is implemented on a different second provider network.

15. A system comprising:
a content data store to store a media file; and
one or more electronic devices to implement a content delivery service, the content delivery service including instructions that upon execution cause the content delivery service to perform operations comprising:
receiving an indication, at the content delivery service from a support service for media player devices, that indicates a set of one or more users of the support service that have a threshold similarity of a record of user preferences for the support service to a record of user preferences of a target user for the support service,
determining, by the content delivery service, a subset of the users, from the set of one or more users of the support service, that have a record of user preferences for the content delivery service,
determining, by a content recommendation service of the content delivery service, a media file to provide to the target user based on the record of user preferences for the content delivery service of the subset of the users, and
sending the media file to a media player device of the target user and that is supported by the support service.

16. The system of claim 15, wherein the record of user preferences for the content delivery service of the subset of the users comprises an embedding vector of user preferences for the content delivery service of the subset of the users, and the determining the media file comprises generating an inference with a machine learning model of the content recommendation service for an input based on the embedding vector of the subset of the users.

17. The system of claim 16, wherein the instructions upon execution cause the content delivery service to perform further operations comprising generating a synthetic embedding vector for the target user based on the embedding vector of user preferences for the content delivery service for each user of a plurality of users of the subset of the users, wherein the input to the machine learning model of the content recommendation service comprises the synthetic embedding vector generated for the target user.

18. The system of claim 15, wherein the instructions upon execution cause the content delivery service to perform further operations comprising determining there is less than a threshold amount of a record of user preferences for the target user with the content delivery service, wherein at least the receiving the indication is in response to the determining there is less than the threshold amount of the record of user preferences for the target user with the content delivery service.

19. The system of claim 15, wherein the instructions upon execution cause the content delivery service to perform further operations comprising determining the target user does not have a content delivery service account, wherein at least the receiving the indication is in response to the determining the target user does not have the content delivery service account.

20. The system of claim 15, wherein the instructions upon execution cause the content delivery service to perform further operations comprising:
updating the record of user preferences of the target user for the support service based on the target user playing or not playing the media file on the media player device of the target user; and
performing another iteration of the operations based at least in part on the updated record of user preferences of the target user for the support service.

* * * * *